United States Patent
Glaser et al.

[15] 3,656,738
[45] Apr. 18, 1972

[54] CONVEYOR OPERATED MISFEED CONTROL MECHANISM FOR MULTIPLE STATION ARTICLE DELIVERY APPARATUS

[72] Inventors: Donald A. Glaser, Emporia, Kans.; Lyle V. Dutro, Pasadena, Calif.; Woodrow W. Pendleton, Emporia, Kans.

[73] Assignee: Diddle-Glaser, Inc., Emporia, Kans.

[22] Filed: Jan. 22, 1970

[21] Appl. No.: 5,033

[52] U.S. Cl. .................................... 270/58, 271/57
[51] Int. Cl. .......................................... B65h 39/02
[58] Field of Search .................. 270/58, 54, 56; 271/57

[56] References Cited

UNITED STATES PATENTS

| | | |
|---|---|---|
| 3,519,264 | 7/1970 | Beachan et al. ............... 270/58 |
| 3,559,982 | 2/1971 | Eppers .......................... 270/58 |
| 3,175,821 | 3/1965 | Gibson .......................... 270/58 |
| 3,525,516 | 8/1970 | Bushnell et al. ............... 270/58 |
| 3,414,257 | 12/1968 | Muller ........................... 270/58 |

*Primary Examiner*—Robert W. Michell
*Assistant Examiner*—L. R. Oremland
*Attorney*—Schmidt, Johnson, Hovey & Williams

[57] ABSTRACT

Control mechanism operated by the conveyor of multiple station article feeding apparatus of the type wherein the feeder unit at each station has a misfeed detector and in the preferred form all feeder units but the first are provided with article feed deactivating structure. The control mechanism includes a plurality of actuators swingably mounted on the endless roller chain of the conveyor and each normally located in a standby position. A solenoid operated shifter for each feeder unit is coupled to the detector of an associate feeder unit for operation thereby and located adjacent to the chain to shift the actuator next movable theretoward. Sensors proximal to each shifter in the direction of movement of the chain are positioned to be actuated by an actuator in the operated position thereof. All but the last sensor in the line thereof are connected to the deactivating structure of the next following feeder unit to deactivate the latter upon misfeed of a preceding feeder unit and the last sensor is connected to reject mechanism at the delivery end of the conveyor. Reset cam structure returns an operated actuator to the standby position after it passes by the delivery end of the conveyor. Optionally, the control mechanism may be set up to cause articles to be fed from each station down the line from a station at which a misfeed has occurred but operable to actuate the reject mechanism for the group of articles when they reach the end of the conveyor.

10 Claims, 7 Drawing Figures

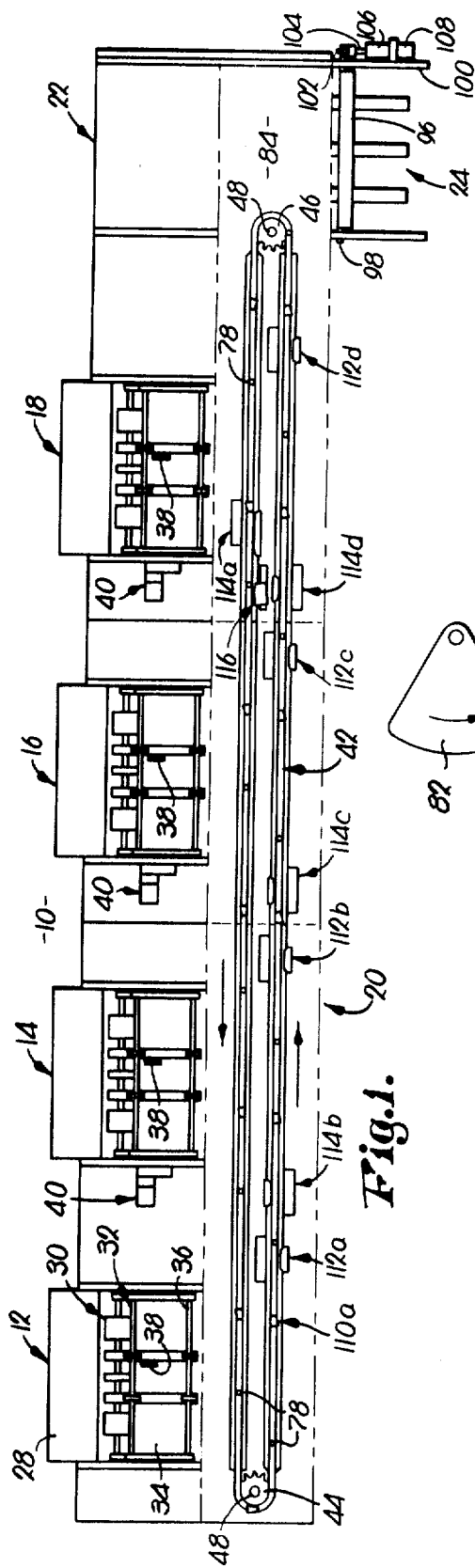
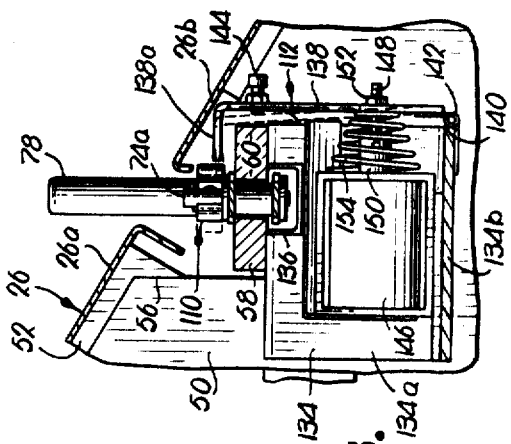
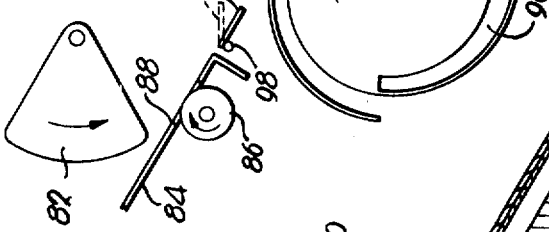
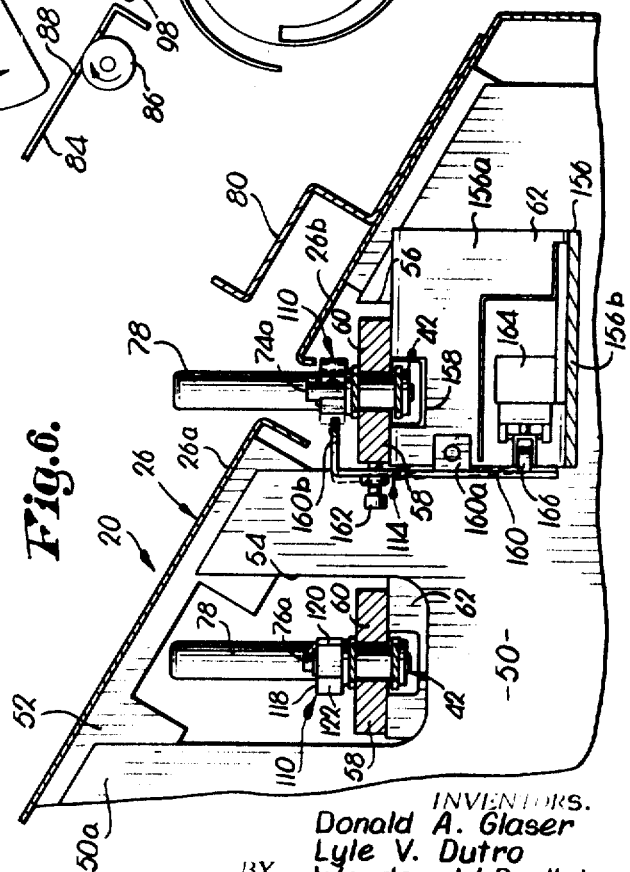

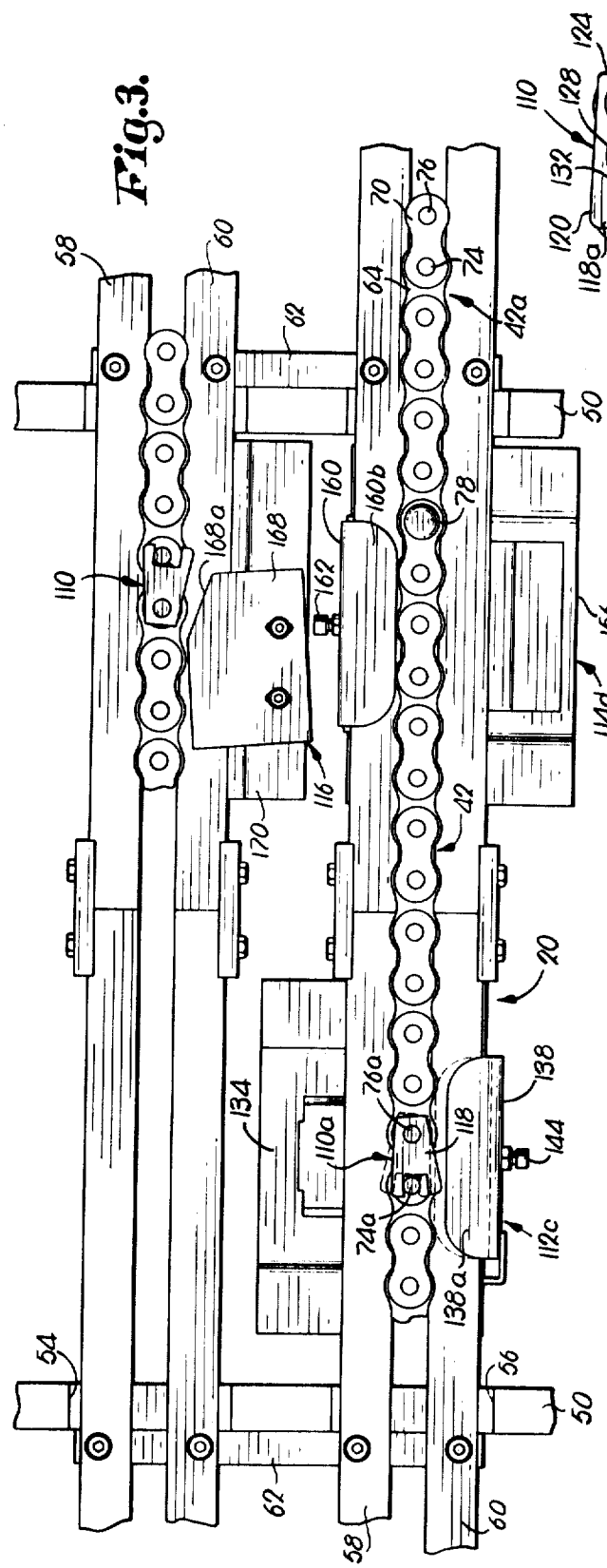

CONVEYOR OPERATED MISFEED CONTROL MECHANISM FOR MULTIPLE STATION ARTICLE DELIVERY APPARATUS

This invention relates to control mechanism for multiple station article feeding apparatus operable to deliver articles from successive units to a common conveyor assembly and wherein the control mechanism in its preferred embodiment is actuated by the conveyor to prevent delivery of articles from all stations following a station where a misfeed has occurred and then operable to reject the articles conveyed to a delivery area in those instances where articles were not directed to the conveyor from all of the delivery stations of the series thereof.

Many types of multiple station article feed and delivery equipment are in use for feeding articles successively from the stations to a common conveyor assembly which, in turn, directs such articles to a receiving area for subsequent handling, packaging, further treatment or use. An example of this type of apparatus presently in use is mechanism for directing various sections of a newspaper from respective feeding mechanisms to a common conveyor which is operable to effect opening of one of the sections for insertion of each section delivered thereafter into the section which has been opened and to then direct the collated sections to another conveyor assembly for delivery to a completed section handling assembly or device for binding a predetermined number of the papers into a package for convenient delivery. Generally speaking, the newspaper feeding assemblies have provision for supporting a number of the individual sections in disposition for successive delivery thereof to a point on the conveyor where the section is received and then moved toward the next station in order that a successive newspaper sections may be inserted in the first section which has been opened at a point immediately adjacent to the first article feeding unit. This process may be repeated any number of times desired limited only by the number of feeding mechanisms which are provided along the length of the common conveyor. The final collated group of papers is received in a delivery area for direction by suitable transfer structure to a unit operable to place a binder around a predetermined number of the collated newspapers for convenient delivery thereof.

Machines as described above are not only useful for collating sections of newspapers but have equal utility in other fields such as book assembling units for a bindery and even have application in bottle filling equipment and package fillers. In all instances though, the multiple station product feeding units located along the length of the common conveyor therefor are constructed to operate at high speeds for greatest efficiency in view of the relatively high cost of such equipment. Misfeed of an article from a feeder unit causes problems in view of the high speed operation of the equipment in that it is relatively impractical for an operator to maintain surveillance over the feeders during operation thereof and oftentimes the collection of products or articles from which one section or product is missing because of misfeed has been conveyed to the delivery area and sent on through the associated mechanism before the operator can even make an effort to shut off the equipment for removal of the uncompleted group of articles.

For this reason, most multiple station article equipment arranged along a common conveyor assembly for the articles is provided with control mechanism for sensing misfeed of an article from a corresponding feeder unit and to thereafter preclude feeding of articles from subsequent feeder units and to effect rejection of the uncompleted assembly of articles at the delivery area therefor. However, the control mechanisms thus far available for units of this type have been expensive, subject to malfunction, and difficult, if not impractical, to modify to accommodate a greater or lesser number of feeding stations making up a particular installation. For example, the owner of a multiple station feeding machine may conclude after initially purchasing a two or three station assembling unit that, in fact, he needs additional stations to accommodate his particular work load. For that reason most machines of the general type referred to herein are of modular design permitting insertion of as many additional feeding units as are necessary in the train thereof along the conveyor therefor, all without substantial modification of the equipment being required.

The most common control mechanisms heretofore available for sensing misfeed of articles from respective feeding units and to reject an assemblage of articles which does not contain the required number thereof at the delivery area have been either electrically or pneumatically operated and employ a central monitoring system such as a rotatable drum provided with a pin thereon for each feeding station, with each pin being operated by a respective electrically or air controlled power actuator on the drum and movable upon operation of the corresponding actuator into disposition to engage and operate a sensor switch establishing a misfeed condition. The control drum generally operates to deactivate all of the feeding stations beyond the one in which a misfeed has occurred as well as rejecting the articles received at the delivery area which do not comprise a complete group thereof from all stations of the machine which are in concurrent operation. The drum assembly is caused to rotate at a speed to move the pins thereon at the same speed of movement of the article-receiving conveyor.

Although the drum type of unit is effective when fully operable, it is expensive, subject to maintenance problems because of the complexity thereof, presents rewiring or air conduit change difficulties when additional article feeding units are moved into the train thereof, and inherently imposes a maximum number of station limitation on the machine since only a certain number of actuators can be mounted so each drum depending on its diameter. Since the first article-feeding station and the last are of such nature that they cannot be used interchangeably with intermediate feeding units, addition of feeders to the series thereof normally must take place in the central part of the train. Accordingly, rewiring of the drum or addition of air lines is necessary upon addition of feeding units to the machine, or for that matter removal of feeding units therefrom, thus making insertion or removal of feeding units from the machine difficult, time consuming, and expensive. Besides rewiring or changing air conduits on the drum, additional power actuators for each feeding station added must be provided on the drum.

It is, therefore, the primary object of the present invention to provide control mechanism operated by the conveyor of multiple station article delivery apparatus capable of detecting misfeed of an article from a respective station and to prevent feeding of articles from subsequent stations in the train thereof and then reject the article or group of articles in the feeding sequence in which a misfeed has occurred without the problems attendant to drum sensing assemblies as described above.

It is a very important object of the invention to provide control mechanism for a multiple station article feeding machine provided with a common conveyor for the feeding stations wherein shiftable actuators are mounted on the endless chain of the conveyor ahead of each of the positions thereon normally occupied by articles received from the corresponding feeding stations and designed to be moved by a shifter operably associated with the misfeed detector of a preceding article feed unit and to operate a sensor adjacent a corresponding actuator shifter which is connected to means for deactivating the next feeding unit so that all feeders are deactivated after a misfeed has occurred, and with the sensor of the last feeding station being operable joined to a reject device at the delivery area to preclude articles from going into the main stream thereof if a misfeed at any station has taken place.

A still further important object of the invention is to provide control mechanism wherein the system is fully expandable at will by the simple expedient of providing actuators for each article-receiving position on the conveyor regardless of the length thereof coupled with addition of an actuator shifter and a sensor for each feeding station added to the machine.

Also an important object of the invention is to provide control mechanism as described which is inherently in time with the feeding units in the conveyor assembly regardless of the speed of operation thereof and as such speed is varied.

A still further important object of the invention is to provide control mechanism for a number of article feeding units wherein any one or more of the article feeders intermediate the initial feeder and the last feeding unit may be selectively deactivated at will by the operator of the machine without any change in the control mechanism itself being required.

An important object of the invention is to provide control mechanism operated by the conveyor of multiple station article delivery apparatus wherein rewiring thereof or changes in air conduits upon addition or removal of an article-feeding unit from the machine is completely avoided by virtue of the fact that actuators which are designed to be shifted by structure responsive to a misfeed detector of a respective article-feeding unit and the misfeed sensors connected to the deactivating mechanism of the next successive article-feeding units are operable independently of other adjacent control devices regardless of the number of article-feeding stations or the length of the common conveyor assembly therefor.

A further object is to provide control mechanism as described which can optionally be set up to detect that a misfeed has occurred at one of the article-feeding stations but permitting articles down the line therefrom to be fed to the conveyor whereupon the group of articles from which one or more is missing are rejected at the delivery area of the machine without interference with the operating speed of the assembly or that the entire structure be shut down to correct the feeding error.

Other important objects and advantages of control mechanism embodying this invention will be described or become obvious as the following specification progresses.

In the drawings:

FIG. 1 is a fragmentary, essentially schematic top plan view representation of multiple station article delivery apparatus having misfeed control mechanism therefor embodying the preferred concepts of this invention and showing a series of article-feeding stations located along the length of a common conveyor therefor, as well as an article-receiving area at one end of the conveyor for directing the assembly of articles to a point of further handling or use;

FIG. 2 is a fragmentary, also essentially schematic representation of mechanism at the article-receiving area at the end of the conveyor as illustrated in FIG. 1, showing components for handling the assembly of articles as well as means for rejecting the single article or assembly thereof if a misfeed occurs;

FIG. 3 is a fragmentary plan view of a part of the conveyor of a multiple station article-delivery machine and illustrating the novel control actuators of the present invention in association with a solenoid controlled shifter therefor and a sensor for sensing disposition of a control actuator in an operated position along with reset cam structure for the control actuators;

FIG. 4 is a fragmentary, side elevational view of the structure illustrated in FIG. 3 with parts thereof being broken away and in section for clarity;

FIGS. 5 and 6 are fragmentary, vertical cross-sectional views taken substantially on the lines 5—5 and 6—6 of FIG. 4; and FIG. 7 is an enlarged plan view of one of the control actuators on the conveyor chain with the central portion thereof being broken away and in section to reveal the internal construction thereof.

The control mechanism of this invention in its preferred embodiment as illustrated is especially suitable for use on multiple station article feed and delivery apparatus shown essentially schematically in FIGS. 1 and 2 and broadly designated by the numeral 10. For purposes of illustration only, four article-feeding units 12, 14, 16 and 18 are depicted in the drawings as representative of a multiple station assembly, but it is to be recognized that any number of feeding units may be provided in end-to-end relationship along the length of the common conveyor assembly designated 20. The end component 22 defining a delivery area 22 at one end of the conveyor 20 has mechanism 24 for either directing the collated articles fed from respective units 12—18 onto conveyor assembly 20, to a handling station, or for rejecting articles fed thereto if one or more of the units 12-18 misfeeds.

The control mechanism for apparatus 10 is adapted for use with article-feeding units of the modular type which may be joined end to end to present as many article feeding stations as desired for a particular job. Generally speaking though, the first article-feeding unit 12 and the last feeding unit 18 are one of a kind, whereas the intermediate units 14 and 16 are of identical construction and operation so that any number of the same may be interposed between end units 12 and 18. Although the feeding units could be of various constructions and utilities, those shown schematically in FIG. 1 are of the type for successively delivering newspaper sections onto the inclined table 26 of the conveyor assembly 20 for collation and ultimate delivery to end component 22 forming a part of apparatus 10. Thus, each of the units 12-18 has an upright support table 28 for receiving a plurality of the newspaper sections in upright disposition, along with pickup and transport mechanism 30 which is cooperable with the vertically oscillatable roller assembly 32 to remove an adjacent newspaper section from the stack thereof, direct the section across the top of platform 34 of the respective unit and under the roller assembly 36 onto the upper face of table 26.

The specific construction and operation of the feeding unit described is not a part of the present invention and has been shown for purposes of illustration only with it being understood that article-feeding units of various types may be controlled with the novel mechanism of this invention so long as the feeding units have a detector 38 associated therewith for indicating misfeed in the event the detector 38 is not actuated by an article moving thereacross in interengagement therewith as the article is transferred to table 26 of conveyor assembly 20. In addition, all of the article-feeding units with the exception of the first unit 12 should be provided with means for preventing feeding of an article onto table 26 if a preceding unit 12 fails to deliver an article to the conveyor table as sensed by the detector 38 forming a part of the feeding unit. In the case of the units 14, 16 and 18 shown schematically in FIG. 1, deactivating means broadly designated 40, is provided on each of the units 14, 16 and 18 in association with a respective pickup and transport mechanism 30. In this instance, each of the deactivating means 40 comprises a solenoid which prevents communication of the corresponding pickup and transport mechanism with a vacuum source each time the solenoid of the deactivating means is energized, thus preventing pickup and delivery of the newspaper section to conveyor assembly 20.

Conveyor assembly 20 may also be of conventional construction involving an endless roller chain 42 (FIGS. 3 and 4) trained at opposite ends thereof around corresponding sprockets 44 and 46 rotatable about parallel upright support shafts 48 carried by horizontal frame members forming a part of apparatus 10. A series of vertical plates 50 below table 26 and having angle members 52 on the upper margins 50a thereof serve to support the upper and lower segments 26a and 26b respectively of table 26. A number of the upright plates 50 are provided along the length of the conveyor assembly 20 in horizontally spaced relationship and have a pair of upwardly opening, upright, horizontally spaced slots 54 and 56 therein which clear corresponding elongated stretches of endless roller chain 42. Two pairs of horizontal, elongated, horizontally spaced blocks 58 and 60 are provided in underlying relationship to table 26, horizontally aligned, extending through respective slots 54 and 56, carried by supporting members 62 on corresponding plates 50 and receiving the elongated stretches of roller chain 42 therebetween for supporting and guiding the latter.

The roller chain 42 is of conventional construction comprising a series of primary links 42a, each made up of upper and lower figure eight shaped plates 64 and 66 interconnected by tubular elements carrying roller sleeves 68 thereon between link plates 64 and 66. Opposed, figure eight shaped connector link plates 70 and 72 pivotally join adjacent links 42a by pins 74 and 76 thereon which extend through the tubular elements between plates 64 and 66.

Elongated, upright pusher rods 78 secured to an extension 74c or 76c of one of the pins 74 or 76 as the case may be, project upwardly through the opening presented by opposed margins of segments 26a and 26b for moving sections of newspaper delivered to conveyor assembly 20, toward the receiving area presented by component 22 as the newspaper sections slide along and are supported by the Z-shaped lower conveyor wall 80. The spacing between adjacent rods 78 is slightly greater than the effective transverse width of the table of each of the platforms 34 of units 12–18 and thereby spaced somewhat greater than the length of the longest article (in this case a newspaper section) adapted to be delivered to conveyor assembly 20 for transport thereby.

It is thus to be recognized that the disposition of rods 78 and the speed of chain conveyor 42 is timed with the operation of units 12–18 so that a newspaper section delivered to the table 26 from corresponding stacks of papers on tables 28 are received between rods 78 so that the trailing rod 78 will engage the rear margin of the newspaper section and move it to the right viewing FIG. 1, toward the delivery area presented by end component 22. Although not shown in the drawings, it is to be understood that apparatus 10 is frequently provided with mechanism operable to separate the folds of the first newspaper section directed onto table 26 as it moves away from the first unit so that the newspaper section delivered from each successive feeding unit is inserted into the newspaper section which has been partially opened and is held in such opened condition throughout the length of the conveyor assembly 20 to thereby present a collated newspaper assembly. This, of course, is not essential to the operability of the control mechanism of this invention.

As indicated schematically in FIG. 2, component 22 has mechanism for receiving the collated newspaper sections to deliver them to a conveyor leading to an area remote from apparatus 10 for further processing or handling. For purposes of illustration, mechanism 24 is shown as having conventional components including a rotatable, segmental drive member 82 above the plateform 84, while the roller assembly 86 underlying platform 84 and projecting through opening 88 therein is cooperable with drive member 82 to direct collated newspaper sections into one of the pockets 90 defined by the curved, horizontally spaced, elongated fingers 92 of creel 94. Fingers 92 are mounted on the body of creel 94 in disposition defining essentially 90° segments around the periphery of the creel with each pocket 90 opening toward platform 84 to receive collated newspaper sections therein as the latter are driven downwardly toward creel 94 by mutually cooperable drive member 82 and roller assembly 86.

A reject gate 96 is provided in proximity to the lower edge of platform 84 for rotation about a horizontal axis and has an elongated supporting shaft 98 projecting through the end all 100 of component 22. Crank 102 connected to the outer end of shaft 98 is pivotally joined to the outer end of a rod 104 reciprocably mounted with a pneumatic cylinder 106 controlled by a solenoid valve 108. In the normal disposition of gate 96 as illustrated in FIG. 2, collated newspaper sections are permitted to be driven down into one of the pockets 90 of creel 94. Upon energization of the solenoid valve 108 to actuate cylinder 106, the rod 104 is retracted to swing gate 96 into the dotted line position of the same illustrated in FIG. 2 to divert any newspapers delivered to plateform 84 over the top of the adjacent ends of fingers 92 defining one of the pockets 90 so that such papers will not be delivered to the conveyor associated with creel 94 leading to handling or processing equipment at the end of the conveyor.

Control mechanism comprising the subject matter of the present invention is made up of a series of actuators broadly designated 110 and mounted on endless roller chain conveyor 42 between rods 78, combined with an actuator shifter 112 for each of the units 12–18, operated actuator sensors 114 for each of the shifters 112, and actuator reset cam structure 116.

Since the actuators 110 are identical in construction, only one of the same will be described in detail with particular reference to FIGS. 3, 4 and 7. As is clear from these Figures, each actuator comprises a frusto-pyramidal block 118 of wear-resistant synthetic resin material such as a phenol-formaldehyde polymer and provided with opposed, upright side faces 120 and 122 which converge in the direction of movement of that stretch of the roller chain on which a corresponding actuator 110 is mounted. Structure for pivotally mounting each block 118 on one of the link plates 42a comprises an extension of a pin (designated 76a in the drawings) with the C retainer 124 on the respective pin 76a serving to hold the block 118 thereon without interfering with rotation of such block about the vertical axis of the corresponding pin 76a. The next adjacent pin 74a of the roller chain conveyor 42 in a direction away from component 22 of apparatus 10 also extends above the upper face of the chain conveyor and is received within the notch 126 of block 118 defined by leg portions 118a and 118b presenting a bifurcated outer end. An elongated passage 128 within block 118, communicating with notch 126 between legs 118a and 118b and extending longitudinally of block 118, carries a coil spring 130 which biases the ball detent 132 outwardly toward the proximal pin 74a. By virtue of this arrangement, the bifurcated end of block 118 is yieldably biased toward a position adjacent the inside of the conveyor chain 42 or as shown by dotted lines in FIG. 3 on the outside of the conveyor chain assembly as indicated by the full line illustration of such Figure.

Each shifter 112 comprises a generally U-shaped support body 134 mounted in underlying relationship to the stretch of roller chain 42 away from delivery units 12–18. The upright, generally L-shaped legs 134a of body 134 are secured to the outer pair of blocks 58 and 60 and have upwardly opening notches 136 therein for clearing the roller chain as is apparent in FIG. 5. A generally L-shaped shifter plate 138 is pivotally mounted on the outer margin 140 of bight portion 134b of body 134 by horizontal hinge structure 142 with the upper, inturned lip portion 138a of plate 138 being located in proximal relationship to the links of chain 42. Adjustment screw 144 threadably mounted in the upper end of plate 138 permits selective variation of the extent of pivoting thereof by solenoid 146 mounted within body 134 on the bight portion 134b thereof. An extension 148 on the armature 150 of solenoid 146 extends through plate 138 and is joined thereto by nut 152 on the outer end of extension 148. Coil spring 154 surrounding armature 150 between the body of solenoid 146 and plate 138 normally biases the latter into the position of the same illustrated in FIG. 5 with lip 138a out of the path of travel of actuators 110 on roller chain 42.

As shown schematically in FIG. 1, a shifter 112 is provided adjacent the right-hand portion of each of the feeder platforms 34 of units 12–18 respectively. The coil of each solenoid 146 is operably connected to the detector 38 of a preceding article feeding unit 12–18 to cause the solenoid 146 associated therewith to be energized when detector 38, comprising a normally closed switch, fails to open under the pressure of a newspaper section passing thereacross, thus indicating a misfeed.

The sensors 114 are also of identical construction and are disposed along the outer stretch of chain 42 with the exception of the sensor 114a associated with the end unit 18 which is located at the backstretch of the chain conveyor 20 as shown in FIG. 1.

First describing the specific construction of each sensor 114 as is apparent from FIG. 6, the U-shaped body 156 has opposed, upright, L-shaped legs 156a underlying and secured to the outer blocks 58 and 60 and also provided with upwardly opening notches 158 therein for clearing the outer stretch of chain 42. An L-shaped sensor plate 160 having bars 160a secured to the inner face thereof adjacent to the side margins of the same, pivotally carried by opposed legs 156a of body 156, has an inturned lip 160b on the upper margin thereof designed to engage an actuator 110 in an operated position. Screw 162 passing through plate 160 and engageable with the proximal margin of outer block 58, regulates the throw of plate 160 about the axis of pivoting movement thereof. Switch 164 carried by the bight portion 156b of body 156 has a contact operator 166 thereon normally engaging the lower part of plate 160 and biasing the latter in a clockwise direction, viewing FIG. 6, to maintain adjustment screw 162 against proximal block 58. The sensor plate 160 is located on the inside of the outer stretch of conveyor chain 42 with the sensors being located in proximal relationship to respective shifters 112 in a direction toward the delivery area defined by component 22 of apparatus 10 so that when an actuator 110 is operated by a corresponding shifter 112, such operated condition of the actuator 110 is immediately sensed by a corresponding sensor 114 and succeeding sensors 114.

Referring to FIG. 1, the sensor 114b associated with shifter 112a is operably connected to the feed deactivating means 40 of newspaper section feed unit 14, while shifter 112a is operated by the detector 38 of unit 12. Similarly, the next shifter 112b is operably associated with the detector 38 of unit 14, while sensor 114c is operably joined to the deactivating means 40 of unit 16. Shifter 112c proximal to the right-hand end of unit 16 is operably connected to the detector 38 thereof, while the next adjacent sensor 114d is joined to the deactivating means 40 of end feeding unit 18. The last shifter 112d operably connected to detector 38 of unit 18 is in proximal relationship to the end sprocket 46 in general alignment with the right-hand margin of platform 84 of end unit 18 to shift an actuator 110 before the latter goes around in sprocket 46.

The sensor 114a on the backside of the conveyor chain 42 is located just inside the left-hand edge of platform 34 of end unit 18 with the plate 160 thereof on the inside of the conveyor chain adjacent inner block 60. The cam structure 116 is positioned to the left of the sensor 114a viewing FIG. 1, on the inside of the inner stretch of the conveyor chain for returning an operated actuator 110 to the standby position thereof as illustrated in FIG. 3. Structure 116 comprises a horizontal plate 168 having an inclined cam surface 168a thereon and mounted on a supporting block 170 in disposition such that the cam surface 168a is located to contact a face 120 of an actuator 110 when the latter is in the position of the same illustrated in FIG. 3 but to clear such actuator when the latter is in the standby position of the same as shown by the full line illustration of the actuator 110 proximal to shifter 112c depicted in FIG. 3.

As is apparent from the preceding description during normal operation of apparatus 10, newspaper sections are delivered in successive order from successive units 12-18 onto the conveyor assembly 20 for movement along table 26 by respective rods 78. Assuming that structure is provided for inserting each section into the first opened section, the collated assembly is directed onto platform 84 and then into a pocket 90 of creel 94 for delivery to a conveyor of component 22 leading to a packaging or handling area.

However, if any one of the units 12-18 misfeeds, it is desirable in accordance with the preferred concepts of the invention that all following units in the train thereof be deactivated during that cycle of operation so that no additional newspaper sections are fed to conveyor assembly 20 and that the incomplete collection of newspaper sections delivered to component 22 be rejected and not directed into a pocket 90 of creel 94 for delivery to the conveyor of component 22. If the first article feeding unit 12 misfeeds, then the rejection mechanism is not necessary as such since all of the following feeding units will be deactivated for that cycle of operation and no newspaper sections will be delivered to the component 22. However, if the unit 12 feeds but the unit 14 misfeeds, then although units 16 and 18 will be deactivated to preclude feeding of newspaper sections therefrom onto conveyor 20, the newspaper section delivered to conveyor assembly 20 by feeding unit 12 must be rejected in component 22 to preclude delivery thereof to the conveyor leading to the primary conveyor assembly of end component 22. For that reason, the reject gate 96 is preferably raised each time one of the units 12-18 misfeeds, even though it might be a misfeed of the first unit 12.

However, assuming first that unit 16 misfeeds the following sequence of operation of the control mechanism takes place. Unit 12 feeds a newspaper section onto conveyor assembly 20 between adjacent rods 78 and the trailing rod pushes the newspaper section toward unit 14 as chain 42 is continuously moved by the drive mechanism connected to one of the sprockets 44 or 46. A newspaper section opening device associated with the conveyor assembly 20 and located between units 12 and 14 is operable to partially open the folded newspaper section delivered from unit 12 and hold such section sufficiently open to permit insertion of a newspaper section from the next adjacent feeding unit. The partially opened section is held in essentially that condition substantially throughout the length of conveyor assembly 20. The detector 38 of unit 12 is depressed during transport of a newspaper section over the platform 34 of unit 12 thereby maintaining the circuit to solenoid 146 of shifter 112 de-energized to preclude actuation of shifter 112a. As a consequence, the actuator 110a (FIG. 1) which next moves toward the shifter 112a remains in the standby position thereof, an also clears the sensor plate 160 of sensor 114b. As the newspaper section delivered to conveyor 20 from unit 12 moves into alignment with the feed mechanism of unit 14, a section from the table 28 thereof is delivered onto table 26 by pickup and transport mechanism 30 associated therewith by virtue of the fact that deactivating means 40 of unit 14 is not energized by closing of switch 164 of sensor 114b. The newspaper section from unit 14 is inserted between the folded portions partially opened of the section from unit 12. Again the rods 78 trailing such interleaved sections move the same toward the unit 16 for insertion of another newspaper section in the first opened section. The deactivating means 40 of unit 16 is not operated because detector 38 of unit 14 senses delivery of a newspaper to conveyor assembly 20 thus preventing operation of shifter 112b and thus preventing operation of deactivating means 40 of unit 16 by sensor 114c.

But, assuming malfunction of the unit 16 for some reason in that pickup and transport mechanism 30 of unit 16 fails to pick up a newspaper section for some reason, the detector 38 of unit 16 fails to be depressed to open the switch thereof thus causing solenoid 146 of shifter 112c to be energized to shift plate 138 thereof counterclockwise viewing FIG. 5, and thus move actuator 110a into the dotted line position shown in FIG. 3 as the lip 138a of plate 138 engages the proximal face 122 of block 118 to shift the bifurcated end of the actuator inwardly toward the central part of the conveyor chain 42 against the bias of ball 132 forced outwardly by spring 130. The actuator 110a is thereby retained in its operated position by contact of ball 132 on the opposite side of the axis of pin 74a.

As the operated actuator 110a continues movement along the outer stretch of conveyor chain 42, the inner face 120 of the operated actuator 1110 contacts the lip 160b of plate 160 to bias the latter in a counterclockwise direction as shown in FIG. 6 to shift the contacts of switch 1 64 into closed disposition thus operating deactivating means 40 of unit 18 as the two sections of newspaper received from units 12 and 14 are moved into alignment with the platform 34 of final article feeding unit 18. The two sections then are delivered to platform 84 whereupon reject gate 96 is raised by virtue of energization of solenoid 108 operably connected to sensor 114a. The latter is located on the backside of the conveyor chain by virtue of the fact that the reject gate 96 cannot be operated until after the sections comprising an assembly which is not complete by virtue of misfeed of one of the delivery units, has been moved onto the plateform 84 for delivery to creel 94 by virtue of timed rotation of drive segment 82 relative to roller assembly 86. Continued movement of the operated actuator 110a into engagement with the cam plate 168 of structure 116 returns the operated actuator to the standby position of the same.

It is important to note in this connection that although the description above has been predicated on successive delivery of newspaper sections from successive units 12–18, as if no additional sections were being delivered to the conveyor assembly 20, this is not in fact the actual case because once a cycle has been completed, all components are returned to the initial condition thereof and a full feeding cycle is initiated and completed provided no other misfeed occurs along the series of delivery units 12–18. However though, if the unit which misfeeds fails to misfeed on another cycle of operation, the deactivation of subsequent feeding units and operation of the reject mechanism is again carried out with the sequence being repeated until the operator of apparatus 10 clears up the difficulty.

Misfeed of any of the units 12–18 has the same effect as previously described except that if unit 12 misfeed as noted, no newspaper sections are delivered onto platform 84 for rejection by gate 96. However, after misfeed, the unit 12 attempts to feed another newspaper section to the conveyor assembly 20 and a normal cycle will be carried out unless one of the units subsequent thereto malfunctions.

It is also now apparent that any feeding units intermediate between end units 12 and 18 may be shut off by the operator of the machine. Any number of intermediate feeding assemblies such as 14 and 16 may be inserted in the train without rewiring of the control mechanism being necessary and lengthening of conveyor chain 42 and provision of an actuator 110 between adjacent rods 78 being the only requirement other than the provision of a shifter 112 and a sensor 114 for each added article feeding unit. Although the drawings and description have detailed electrically actuated mechanism, it is to be appreciated that the entire system or portions thereof may be pneumatically operated if desired, preferably using air operated servo valves for this purpose. For example, air valves may be used in place of switches 164 and pneumatic piston and cylinder assemblies substituted for solenoids 146. Hydraulically operated components may also be substituted for the electrically actuated devices shown and described herein if this is found to be advantageous for a particular installation.

If the operator of the machine desires to permit all of the feeding units in the train to direct an article to the conveyor assembly 20 if they are capable of doing so even if one of the feeding units fails to operate during one cycle, but to then reject such incomplete assembly of articles before they can be directed onto the delivery conveyor of end component 22, this can readily be accomplished by simply removing the shifter 112 and sensor 114 of intermediate units 14 and 16 from the control sequence. In this case, even though one of the actuators 110 is shifted upon misfeed of a corresponding feeding unit, such operated condition of the actuator is not sensed until it approaches the sensor associated with end unit 18 to thereby effect operation of the reject gate 96 when the assembly of incomplete articles approach creel 94.

Having thus described the invention, what is claimed as new and desired to be secured by Letters Patent is:

1. In multiple station article feeding and delivery apparatus provided with a series of article feeding units for directing articles in successive order from the units to a common conveyor assembly having structure for moving articles fed thereto to a receiving area and wherein each of the article feeding units is provided with an article misfeed detector and all article feeding units but the first in the series thereof are each provided with means for deactivating a respective article feeding unit upon command, the combination with said apparatus of control mechanism comprising:

a plurality of actuators mounted on the conveyor assembly structure for movement therewith and each having a shiftable component movable relative to the structure between normal and operated positions thereof, there being an actuator on the conveyor assembly structure ahead of each position thereon normally occupied by articles received from the article feeding units;

an actuator shifter for each article feeding unit respectively, located adjacent the conveyor assembly in association with a corresponding article feeding unit and including a shiftable member, each shifter being operably associated with the detector on the respective article feeding unit for operation by said detector to shift the member into engagement with the component of the next actuator movable theretoward and to move said component from said normal position of the same to the operated position thereof as a result of misfeed by the corresponding article feeding unit;

a delivery feed sensor for each of the shifters except the one associated with the last article feeding unit of the series thereof and disposed to be actuated by the component of an actuator in said operated position of the same, each of said delivery feed sensors being operably associated with the deactivating means of the next successive article feeding unit for initiating operation of the deactivating means therefor upon actuation of the corresponding sensor;

means at said area for rejecting articles delivered thereto;

a reject sensor connected to said reject means for operating the latter and located to be engaged by an operated component of an actuator after the latter has been passed by the shifter associated with the last article feeding unit of the series thereof; and actuator reset means adjacent the conveyor assembly structure for engaging an operated actuator component to return the same to said normal position thereof after passing by said reject sensor.

2. The combination with apparatus as set forth in claim 1, wherein said conveyor assembly includes endless structure having a stretch adjacent the article feeding units and wherein the member of each shifter is mounted for pivoting movement adjacent a corresponding part of said stretch of the conveyor assembly structure and is shiftable from a normal position clearing the actuator components next movable theretoward into the operated position of the same, there being power means joined to said member of each shifter and coupled to a corresponding detector for operation thereby.

3. The combination with apparatus as set forth in claim 1, wherein said conveyor assembly includes endless structure having a stretch adjacent the article feeding units and wherein each delivery feed sensor of the mechanism comprises an element mounted for pivoting movement adjacent a corresponding part of said stretch of the conveyor assembly structure and disposed to be moved by an actuator component passing thereby in an operated position, and a switch associated with each element for actuation thereby and coupled to a corresponding deactivating means for initiating operation of the latter.

4. The combination with apparatus as set forth in claim 1, wherein said conveyor assembly includes endless structure having a first stretch movable toward the receiving area and a second stretch returning from said area during operation of the conveyor assembly and wherein said reject sensor of the mechanism comprises an element mounted for pivoting movement adjacent a part of the return stretch of the endless structure proximal to the last article feeding unit of the series thereof and disposed to be moved by an actuator component passing thereby in an operated position, and a switch associated with said element for actuation thereby and coupled to said reject means for initiating operation of the latter.

5. The combination with apparatus as set forth in claim 1, wherein said conveyor assembly includes endless structure having a first stretch movable toward the receiving area and a second stretch returning from said area during operation of the conveyor assembly and wherein said reset means of the mechanism comprises a cam located adjacent the return stretch of the conveyor structure in disposition to engage each actuator component in an operated position to return the same to the standby position thereof.

6. The combination with apparatus as set forth in claim 1, wherein each actuator of the mechanism comprises a block mounted for pivoting movement about an axis perpendicular to the path of travel of the conveyor assembly structure, and yieldable retainer means on each block and engageable with the conveyor assembly structure for yieldably maintaining the corresponding block in the normal position thereof until operated and vice versa.

7. The combination with apparatus as set forth in claim 1, wherein said conveyor assembly includes endless roller chain structure having pivotally interconnected links and wherein each actuator of the mechanism comprises a block, pin means on the chain structure at the joint between a pair of adjacent links rotatably supporting the block at one end thereof, a stop pin on the chain at the opposite end of the block, and detent means carried by the block and engaging the stop pin for yieldably retaining the block in one of the positions thereof.

8. The combination with apparatus as set forth in claim 7 of control mechanism wherein each of said blocks is of longitudinally tapered configuration having opposed faces which diverge as said stop is approached, each of said stop pins being located in disposition following a corresponding block mounting pin in the direction of movement of the conveyor assembly structure.

9. In multiple station article feeding and delivery apparatus provided with a series of article feeding units for directing articles from successive units to a common conveyor assembly having structure for moving articles delivered thereto to a receiving area and wherein at least one of the article feeding units has an article misfeed detector and each article feeding unit next adjacent an article feeding unit provided with a detector in a direction toward the receiving area has means for deactivating a respective article feeding unit upon command, the combination with said apparatus of control mechanism comprising:

a plurality of actuators mounted on the conveyor assembly structure for movement therewith and each having shiftable component movable relative to the structure between normal and operated positions thereof, there being an actuator on the conveyor assembly structure ahead of each position thereon normally occupied by articles received from the article feeding units;

an actuator shifter for each article feeding unit provided with deactivation means, located adjacent the conveyor assembly in association with the preceding article feeding unit in a direction away from the receiving area and including a shiftable member, each shifter being operably associated with the detector of a preceding article feeding unit for operation by said detector to shift the member into engagement with the component of the next actuator movable theretoward and to move said component from said normal position of the same to the operated position thereof as a result of misfeed by a preceding article feeding unit;

a delivery feed sensor for each shifter located in proximal relationship thereto in a direction toward the receiving area and disposed to be actuated by an operated actuator component, each of said delivery feed sensors being operably associated with the deactivating means of the next successive article feeding unit for initiating operation of the deactivating means therefor upon actuation of the corresponding sensor; and means for returning an operated actuator component to the normal position thereof after the actuator has moved by the last sensor in approaching said receiving area.

10. The combination with apparatus as set forth in claim 9 wherein said delivery feed sensors are selectively associated with the deactivating means of the next associated article feeding unit.

* * * * *